UNITED STATES PATENT OFFICE.

GEO. W. GOODHUE, OF CINCINNATI, OHIO.

IMPROVED LUBRICATING COMPOSITION.

Specification forming part of Letters Patent No. 41,151, dated January 5, 1864.

*To all whom it may concern:*

Be it known that I, GEORGE W. GOODHUE, of Cincinnati, Hamilton county, Ohio, have invented a new and useful Lubricating Composition or Axle-Tar; and I do hereby declare the following to be a full, clear, and exact description thereof and the mode of compounding the same.

The object of my invention is a lubricating mixture or compound which, with sufficient "body" or substance to maintain its place on the axle, shall combine the qualities of permanent unctuousness and entire freedom from gumming, oxidation, and decomposition either from severe use or long exposure.

I take, by liquid measure, the soft or semi-fluid sediment of the candle-factory, technically known as "residuum," and of about the consistence of thick molasses, two parts; common pine-tar, one part. Stir the above over a slow fire until nearly boiling, and then barrel for use.

The article here referred to as "residuum" is taken from the candle-vat in a semi-fluid state, and contains a large amount of oily matter. It is thus entirely distinct from the hard, brittle material commonly known as "candle-pitch."

I am aware that a patent was granted on the 24th of February, 1863, to James P. Gay for a lubricant consisting of candle-pitch combined with oil; but

What I claim as my invention, and desire to secure by Letters Patent, is—

As an improvement on the above, a lubricant composed by taking residuum from the decomposing-vat when only partially divested of oil and combining pine-tar therewith, in manner and in proportions substantially as specified.

In testimony of which invention I hereunto set my hand.

GEO. W. GOODHUE.

Witnesses:
GEO. H. KNIGHT,
CHARLES L. FISHER.